United States Patent
Lesniewski

(10) Patent No.: US 10,612,690 B2
(45) Date of Patent: Apr. 7, 2020

(54) CHECK VALVES

(71) Applicant: Hamilton Sundstrand Corporation, Charlotte, NC (US)

(72) Inventor: Jacek Lesniewski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/457,132

(22) Filed: Mar. 13, 2017

(65) Prior Publication Data

US 2017/0268696 A1  Sep. 21, 2017

(30) Foreign Application Priority Data

Mar. 15, 2016 (EP) .................................... 16461509

(51) Int. Cl.
*F16K 47/02* (2006.01)
*F16K 15/03* (2006.01)

(52) U.S. Cl.
CPC .......... *F16K 47/023* (2013.01); *F16K 15/038* (2013.01); *Y10T 137/7898* (2015.04)

(58) Field of Classification Search
CPC . F16K 47/023; F16K 15/038; Y10T 137/7898
See application file for complete search history.

(56) References Cited

U.S. PATENT DOCUMENTS

| | | | |
|---|---|---|---|
| 1,147,292 A | | 7/1915 | Benson et al. |
| 2,781,054 A | * | 2/1957 | Neumann ............... F16K 15/03 137/527.8 |
| 4,230,148 A | * | 10/1980 | Ogle, Jr. ................ F16K 15/038 137/512.1 |
| 4,249,567 A | * | 2/1981 | Weiss ..................... F16K 15/038 137/512 |
| 4,586,738 A | * | 5/1986 | Butler ..................... B60R 19/20 293/107 |
| 4,694,853 A | * | 9/1987 | Goodwin .............. F16K 15/038 137/512.1 |
| 4,867,199 A | * | 9/1989 | Marx ..................... F16K 15/038 137/512.1 |

(Continued)

FOREIGN PATENT DOCUMENTS

| | | |
|---|---|---|
| CN | 203880155 U | 10/2014 |
| DE | 9202742 U1 | 4/1992 |

(Continued)

OTHER PUBLICATIONS

Extended European Search Report for International Application No. 16461509.8, dated Jul. 6, 2016, 2 pages.

*Primary Examiner* — Craig M Schneider
*Assistant Examiner* — Kevin R Barss
(74) *Attorney, Agent, or Firm* — Cantor Colburn LLP

(57) ABSTRACT

A check valve comprises a valve housing defining a valve opening and a pair of flapper elements pivotably mounted to the valve housing for rotation relative to the housing between an open position in which they permit fluid flow through the valve opening and a closed position in which they prevent fluid flow through the valve opening. Each flapper element comprises at least one bumper element arranged to engage a stop when in the open position, the bumper element comprising an elastically deformable tongue extending from an upper surface of the flapper element.

18 Claims, 6 Drawing Sheets

(56) References Cited

U.S. PATENT DOCUMENTS

| | | | | |
|---|---|---|---|---|
| 4,892,540 A * | 1/1990 | Vallana | ............... | A61F 2/2403 137/512.1 |
| 4,967,199 A * | 10/1990 | Gunton | ............... | G01S 13/0209 342/158 |
| 4,977,926 A * | 12/1990 | Hocking | ............... | A47B 96/068 137/512.1 |
| 5,038,268 A * | 8/1991 | Krause | ............... | G05B 19/0421 137/624.2 |
| 5,381,821 A * | 1/1995 | Muddiman | ............... | F16K 15/038 137/454.2 |
| 5,392,810 A * | 2/1995 | Cooper | ............... | F16K 15/038 137/512.1 |
| 5,711,343 A * | 1/1998 | Beckett | ............... | F16K 15/038 137/512.1 |
| 7,311,740 B2 * | 12/2007 | Williams | ............... | F16K 15/038 137/512.1 |
| 7,562,669 B2 * | 7/2009 | McGonigle | ............... | F16K 15/038 137/15.18 |
| 8,714,190 B2 * | 5/2014 | Shanker | ............... | F16K 15/038 137/512.1 |
| 8,844,563 B2 * | 9/2014 | Hawa | ............... | F16K 1/22 137/512.1 |
| 2008/0053536 A1 * | 3/2008 | Denike | ............... | B64D 13/02 137/512.1 |
| 2010/0282340 A1 * | 11/2010 | Dehais | ............... | F16K 15/038 137/511 |
| 2015/0330524 A1 | 11/2015 | Talawar et al. | | |

FOREIGN PATENT DOCUMENTS

| | | |
|---|---|---|
| EP | 0361731 A2 | 4/1990 |
| EP | 2249068 A2 | 11/2010 |
| JP | H0517277 U | 3/1993 |
| JP | 2012202485 A | 10/2012 |

* cited by examiner

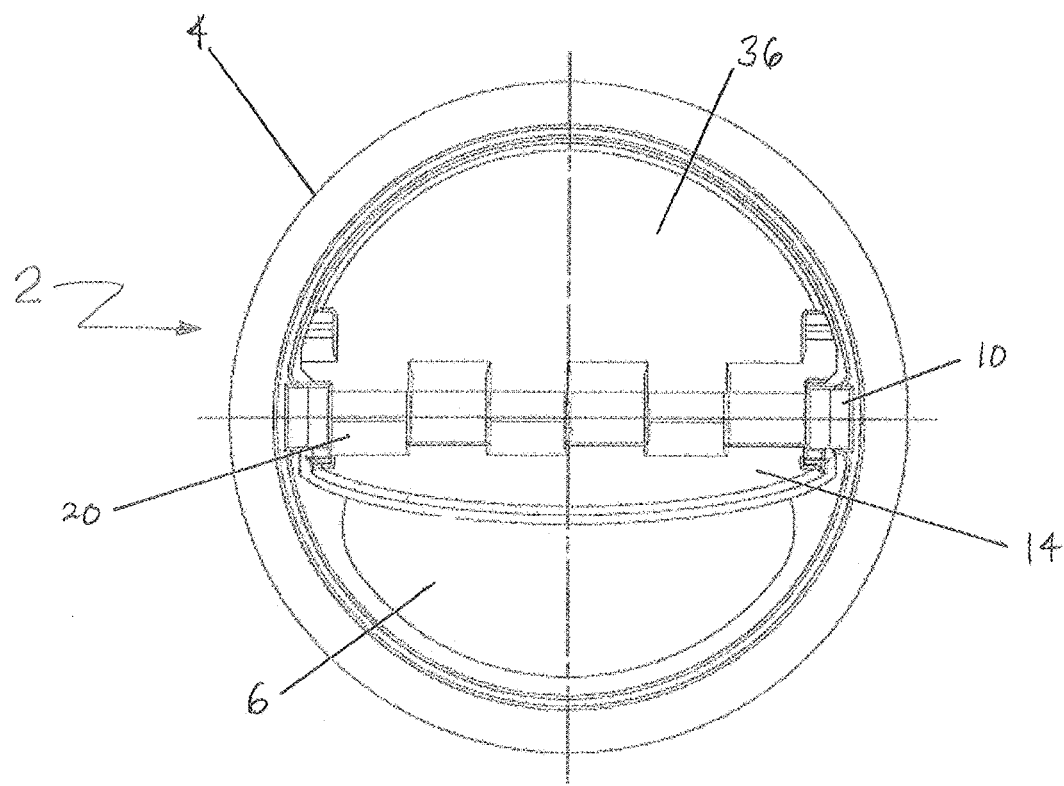
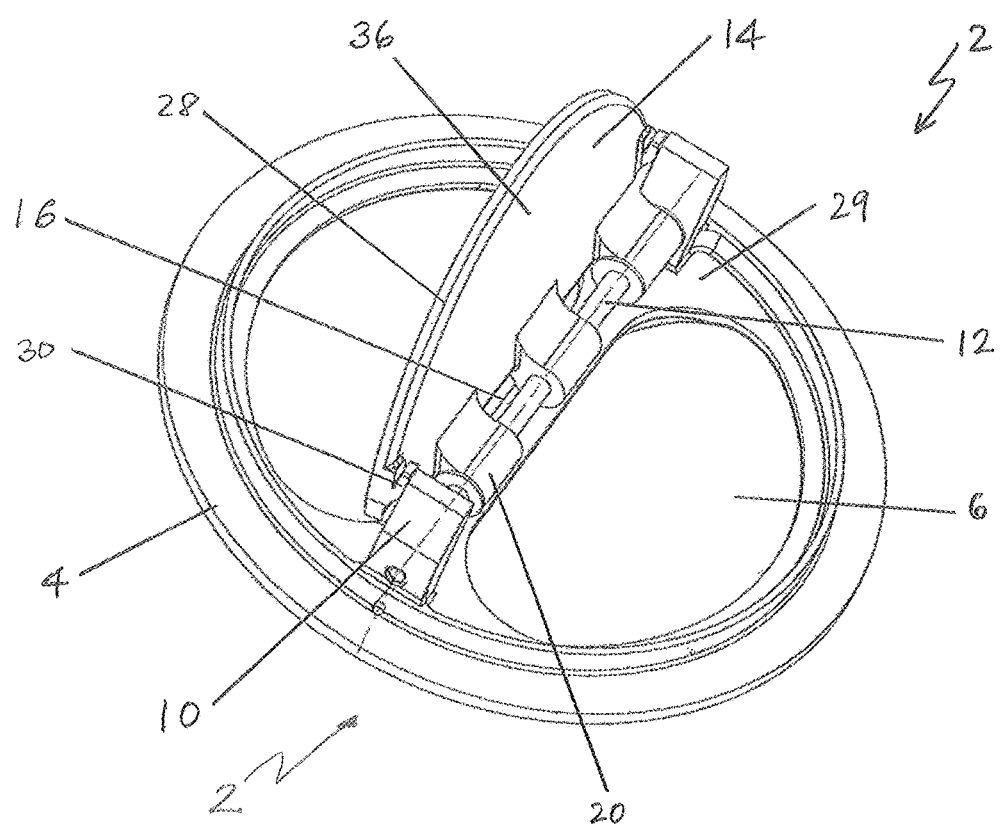

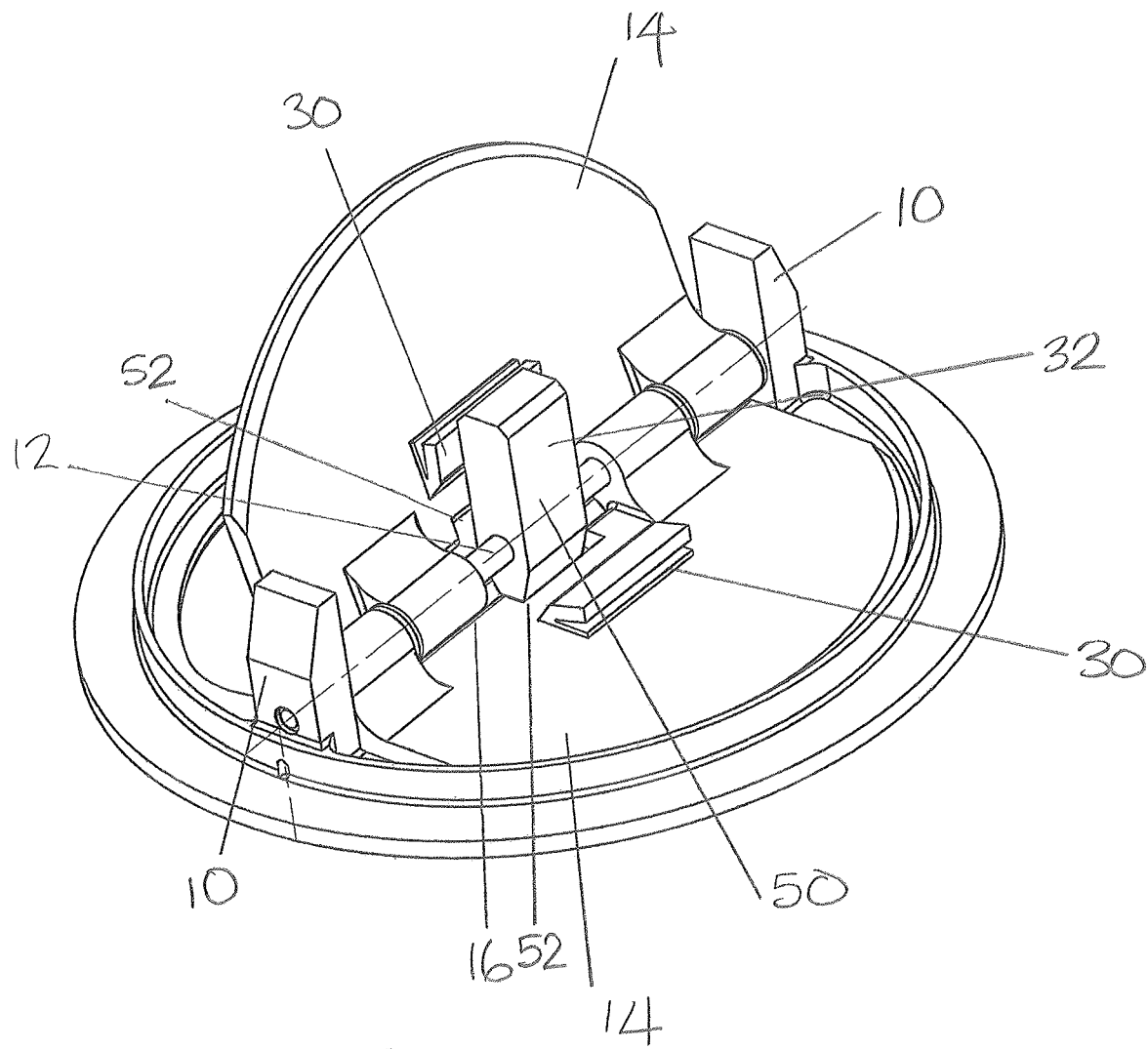

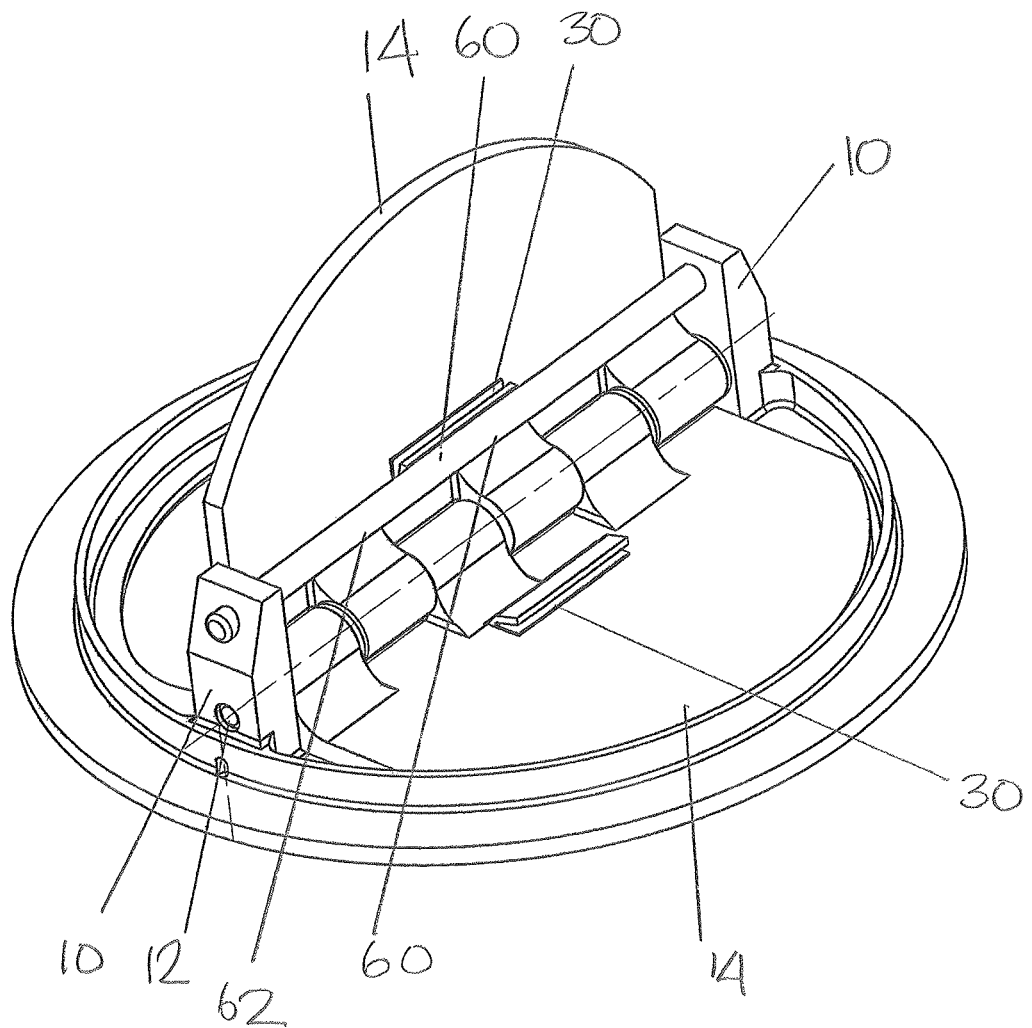

CHECK VALVES

FOREIGN PRIORITY

This application claims priority to European Patent Application No. 16461509.8 filed Mar. 15, 2016, the entire contents of which is incorporated herein by reference.

TECHNICAL FIELD

The present disclosure relates to check valves, and check valve flapper elements.

BACKGROUND

It is known to use check valves to allow fluid flow in one direction therethrough, and to prevent flow in the opposite direction. Check valves are widely used in a wide variety of applications, for example in air conditioning systems, for example in aircraft air conditioning systems.

Check valves commonly include a pair of hinged flapper elements that pivot open in the direction of fluid flow when the fluid pressure differential exceeds a predetermined valve "cracking pressure". If a negative pressure differential exists across the valve, the flapper elements close, preventing flow reversal. Such check valves typically include a pair of flapper elements and frequently employ bumper elements that engage with a stop surface in order to restrict the opening movement of the flapper element past a predetermined maximum opening angle.

The flapper elements of such prior art flapper valves typically open at high velocities, which typically results in relatively large impacts between the bumper elements and the stop surface when the maximum opening angle is reached. This may result in damage to the check valve components, leading to reduced part lifetimes.

The present disclosure relates to a check valve and check valve flapper element which includes a modified bumper element.

SUMMARY

According to the present disclosure, there is provided a check valve comprising a valve housing defining a valve opening and a pair of flapper elements pivotably mounted to the valve housing for rotation relative to the housing between an open position in which they permit fluid flow through the valve opening and a closed position in which they prevent fluid flow through the valve opening. Each flapper element comprises at least one bumper element arranged to engage a stop when in the open position, the bumper element comprising an elastically deformable tongue extending from an upper surface of the flapper element.

A pair of mounting posts may be arranged on opposed sides of the valve opening and a hinge pin is mounted between the mounting posts. The at least one bumper element may be arranged at a side region of the flapper element for engagement with a stop provided on a mounting post.

In another embodiment, a stop surface may be provided on a post extending away from the opening between the mounting posts, and the bumper element be positioned intermediate the sides of the flapper element, for example generally centrally thereof.

In a further embodiment, a stop surface may be formed on a stop pin extending between the mounting posts above the hinge pin, and one or more bumper elements may be provided on the flapper element to engage the stop pin.

According to another aspect of the present disclosure, there is provided a flapper element for a check valve. The flapper element comprises a bumper element for engagement with a stop provided on the check valve. The bumper element comprises an elastically deformable tongue extending from a surface of the flapper element.

A pair of bumper elements may be arranged at opposite side regions of the flapper element.

In other configurations, a bumper element may be arranged generally centrally of the flapper element.

The elastically deformable tongue may comprise a convexly curved upper surface for engaging the stop.

The upper surface may be smoothly curved or facetted.

A groove may be formed between the elastically deformable tongue and the upper surface of said flapper element.

The groove may diverge from a proximal end to a distal end.

The proximal end of the groove may be rounded.

In certain embodiments, the elastically deformable tongue may be formed integrally with the flapper element.

In other embodiments, the elastically deformable tongue may be machined into the flapper element.

The flapper elements may be generally D-shaped.

In certain embodiments, the flapper element may comprise nickel steel.

In other embodiments, the flapper element may comprise an aluminium alloy.

BRIEF DESCRIPTION OF THE DRAWINGS

Some exemplary embodiments and features of the present disclosure will now be described by way of example only, and with reference to the following drawings in which:

FIG. 3 shows a plan view of the check valve of FIGS. 1 and 2;

FIG. 4 shows a perspective view of the check valve of FIGS. 1 to 3 with one flapper element removed for clarity purposes;

FIG. 8 shows a perspective view of a second embodiment of check valve in accordance with this disclosure; and FIG. 9 shows a perspective view of a third embodiment of check valve in accordance with this disclosure.

DETAILED DESCRIPTION

Figure 1:
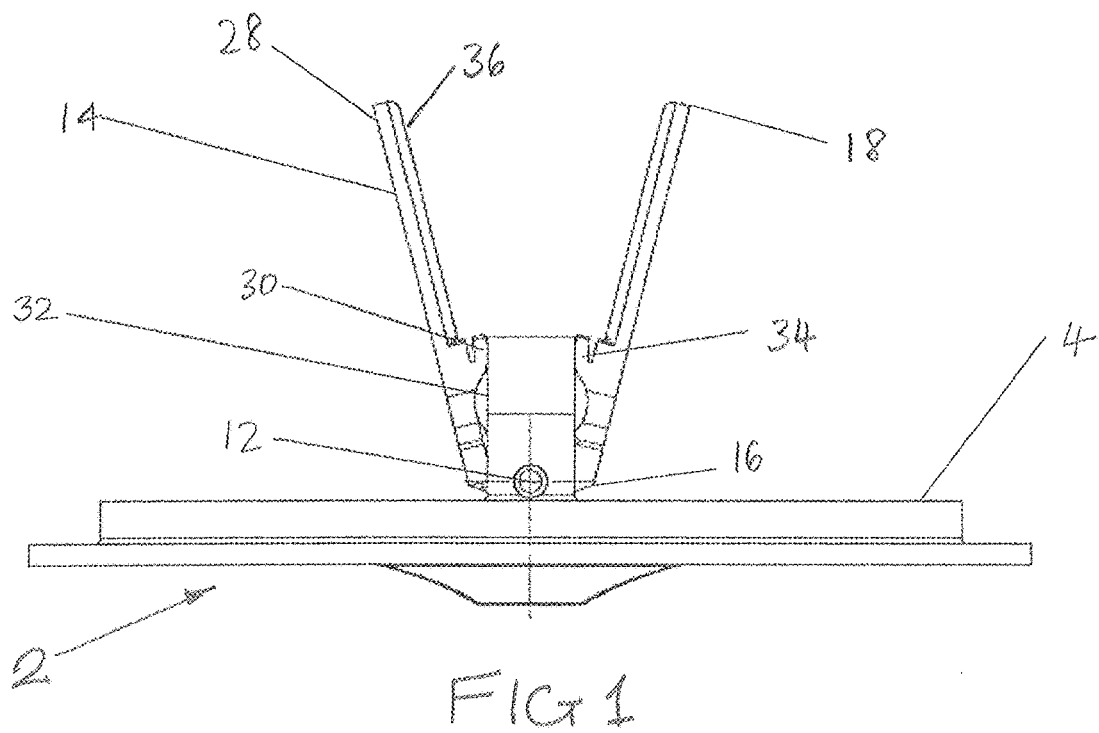
FIG. 1 shows a side view of a first embodiment of check valve in accordance with this disclosure, in an open configuration.

With reference to FIGS. 1 to 4, a check valve 2 in accordance with this disclosure is illustrated. The check valve 2 is configured to be mounted around its periphery in or to, for example, a duct in order to prevent reverse flow of a fluid through the duct.

The check valve 2 comprises a valve housing 4, in this embodiment formed as a generally planar annular element. The valve housing 4 comprises a pair of valve openings 6 which are separated by a central web 8 of the valve housing 4.

A pair of mounting posts 10 are arranged on opposed sides of the valve housing 4 and extend upwardly from the valve housing 4. The mounting posts 10 may be integrally formed, for example cast, with the valve housing 4. Alternatively, the mounting posts 10 may be separately formed from the valve housing 4 and mounted thereto by suitable means, for example by welding, brazing or by suitable fastening means.

A hinge pin 12 is mounted between the mounting posts 10 above the central web 8 of the valve housing 4. The hinge pin 12 may be a unitary structure as shown, or be constituted from two or more sections, for example.

The valve openings 6 are closed by a pair of generally planar D-shaped flapper elements 14 which are pivotally mounted to the hinge pin 12. Each flapper element 14 includes a proximal end 16 and a distal end 18 and includes one or more mounting lugs 20, in this embodiment three mounting lugs 20, positioned at its proximal end 16. The mounting lugs 20 have respective bores 22 through which the hinge pin 12 extends. The mounting lugs 20 of the respective flapper elements 14 alternate along the hinge pin 12.

Figure 2:
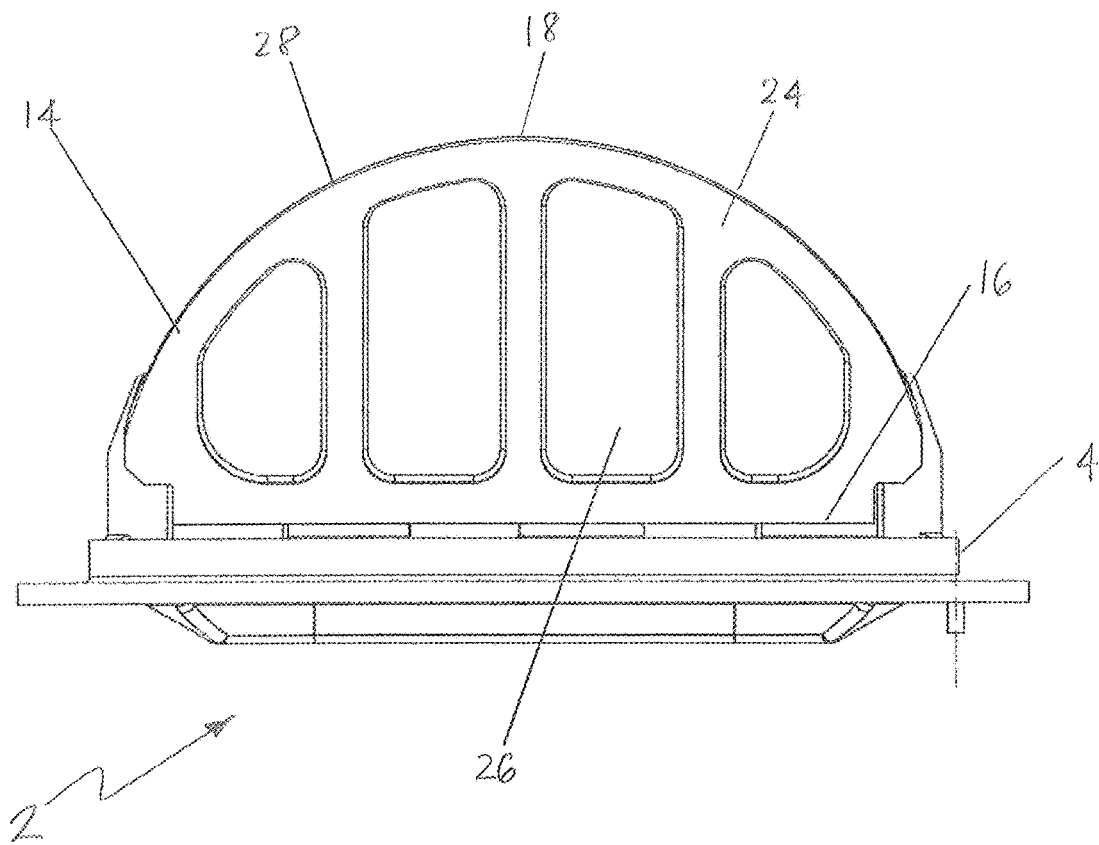
FIG. 2 shows a rear view of the check valve of FIG. 1.

As shown in FIG. 2, the lower surfaces 24 of the flapper elements 14 are provided with a plurality of recesses 26, for weight saving purposes, although this is not essential.

The flapper elements 14 are configured to move between an open position and a closed position, permitting or preventing flow through the openings 6 respectively. It will be appreciated that the arrangement shown in FIG. 3 (i.e. where only one flapper element 14 is in the open position) is simply illustrative, and in practice both flapper elements 14 will move together. The peripheral region 28 of the lower surface of each flapper element 14 engages the flange 29 surrounding the respective valve housing opening 6 when the valve 2 is in the closed position, forming a seal therebetween.

As discussed so far, the construction of the check valve 2 is conventional.

However, each flapper element 14 further comprises at pair of bumper elements 30 at its proximal end. In this embodiment two bumper elements 30 are arranged at opposite sides of the flapper element 14, although it will be appreciated that other bumper element arrangements may fall within the scope of the disclosure.

The bumper elements 30 are configured to engage respective stop surfaces 32 formed on the respective mounting posts 10 when the flapper elements 14 are in the open position to prevent the flapper elements 14 from opening beyond a maximum opening angle. The maximum opening angle may be determined based upon the valve design or flow requirements, for example.

The stop surface 32 in this embodiment is simply formed as a vertical planar surface of the mounting post 10.

Figure 5:
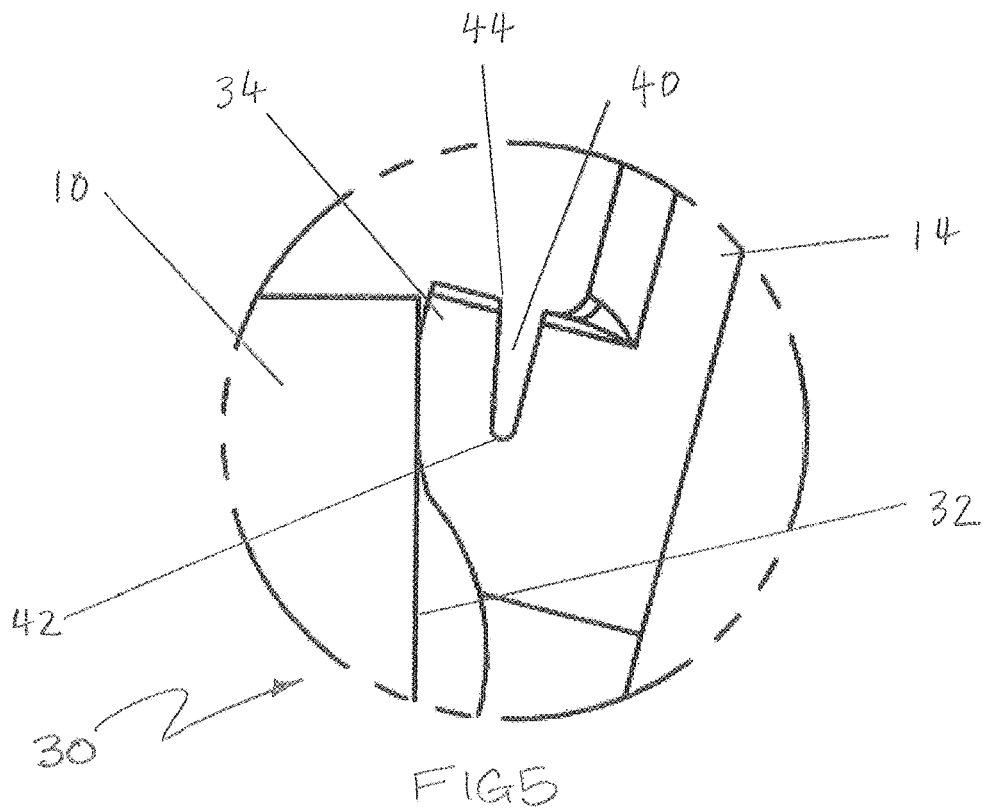
FIG. 5 shows a detailed side view of the bumper element of the flapper element shown in FIGS. 1 to 4.
Figure 6:
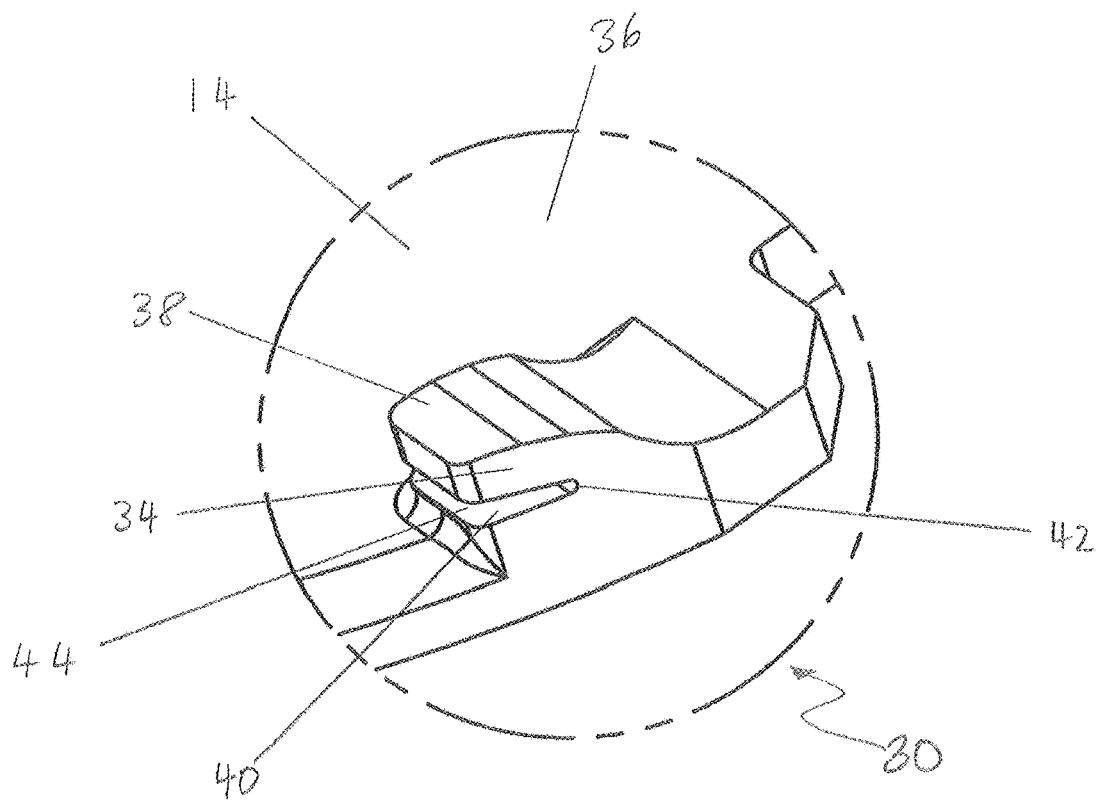
FIG. 6 shows a detailed perspective view of the bumper element of FIGS. 1 to 4.
Figure 7:
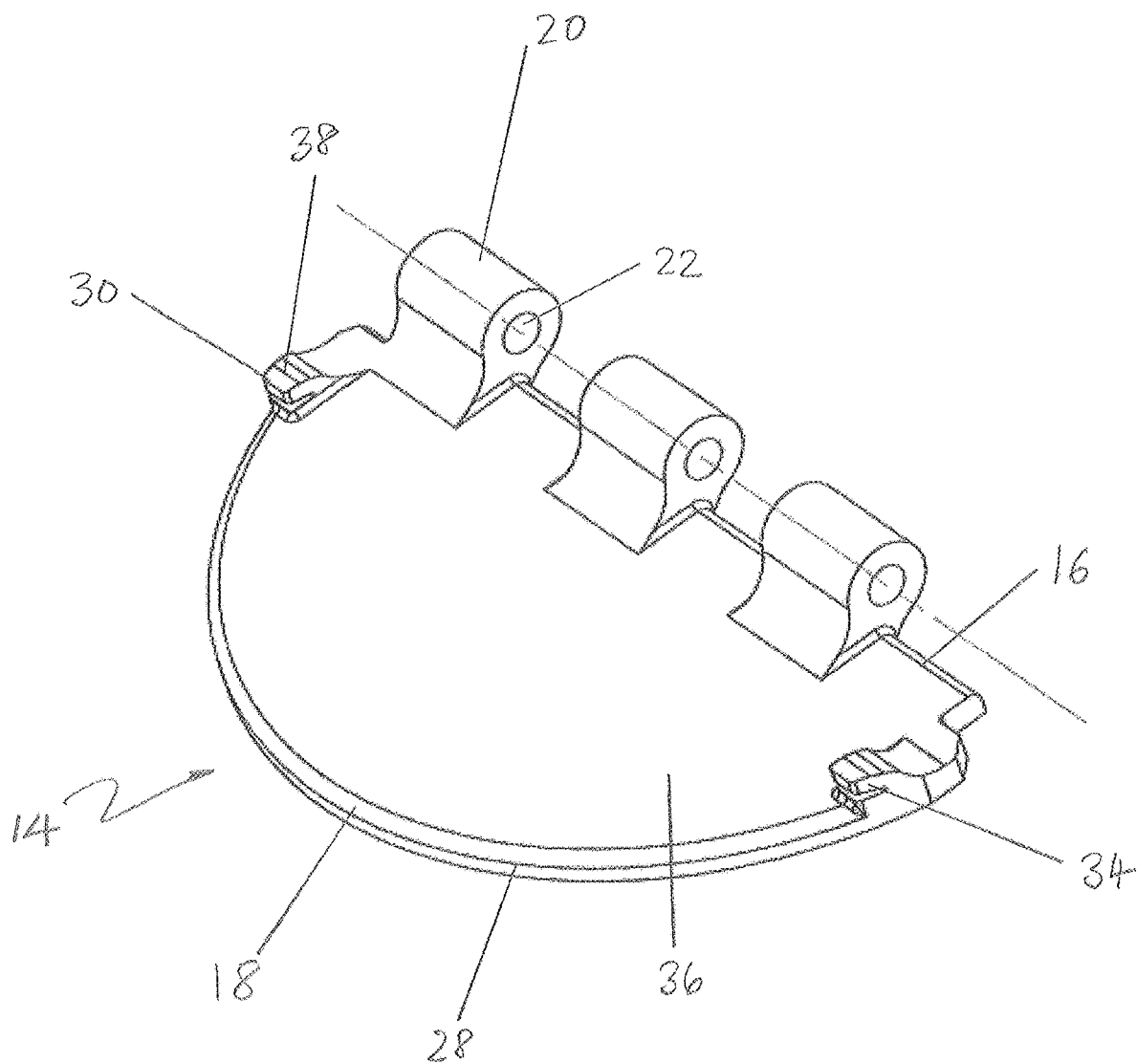
FIG. 7 shows a perspective view of the flapper element of FIGS. 1 to 4.

FIGS. 5 and 6 illustrate detailed side and perspective views of the bumper element 28. Each bumper element 30 comprises an elastically deformable tongue 34 that extends from the upper surface 36 of the flapper element 14, i.e. the surface of the flapper element 14 facing away from the valve openings 6. The elastically deformable tongue 34 includes a convex upper surface 38 for engaging the stop surface 32 of the mounting post 10. In this embodiment, the upper surface 38 comprises a rounded convex surface. In other embodiments, the surface 38 may, for example be facetted, that is, comprising a number of angled planar or curved surfaces.

The elastically deformable tongue 34 may be integrally formed, for example cast, with the flapper element 14. Alternatively, the elastically deformable tongue 34 may be machined into the flapper element 14.

A groove 40 is defined between the tongue 34 and the upper surface 36 of the flapper element 14. In this embodiment, the groove 40 diverges from a proximal end 42 to a distal end 44. It will be appreciated however, that the groove 40 may not diverge, but may rather be a slot with parallel edges, for example. As shown in FIGS. 5 and 6, the proximal end 42 of the groove 40 is rounded to provide improved stress distribution at the proximal end 42 of the groove 40.

In operation, each of the flapper elements 14 is configured to move pivotally about the hinge pin 12 between a closed position and an open position. When the flapper elements 14 move into the fully open position, the upper surfaces 38 of the respective elastically deformable tongues 34 engage with the stop surface 32 of the respective mounting post 10, preventing pivotal movement of each of the respective flapper elements 14 beyond this position.

The groove 40 defined between the bumper element 30 and the upper surface 36 of the flapper element 14 permits the tongue 34 to elastically deflect toward the flapper element 14. This elastic deformation of the tongue 34 dissipates energy as the bumper element 30 impacts the stop surface 32 of the mounting post 10. Moreover, the convex shape of the upper surface 38 of the elastically deformable tongue 34 facilitates relative sliding motion between said bumper elements 30 and said mounting posts 10. The relative sliding motion will also facilitate energy dissipation The bumper design may therefore allow the flapper elements 14 to open at higher velocities without inflicting damage to the flapper elements 14 or the mounting posts 10, which in turn may improve valve lifespan.

The material chosen to manufacture the flapper and bumper elements 14, 30 will depend on the particular application. For example, in low temperature and/or pressure applications, an aluminium alloy may be a suitable material. For higher temperature and/or temperature applications, a steel, such as a nickel steel (for example Inconel®) or a stainless steel may be appropriate. Similar materials may be used for the valve housing 4 and mounting posts 10.

The figures and the accompanying description above describe a particular embodiment of the disclosure and it will be understood that modifications may be made to the described embodiment without departing from the scope of the disclosure.

For example, although the convex upper surface 38 of the bumper element 30 may be advantageous, in other embodiments, the upper surface 38 may be planar.

Also, the stop may be provided on a different portion of the check valve 2. In one alternative embodiment, illustrated in FIG. 8, a stop surface 32 may be provided on a post 50 extending upwardly from the central web 8. The hinge pin 12 extends into or through the post 50. As illustrated, the post 50 may be arranged centrally between the mounting posts 10. In this embodiment, the bumper element 30 is be positioned intermediate the sides of the flapper element 14, generally centrally thereof at an appropriate spacing from the proximal end 16 of the flapper element 14. The proximal end 16 of the flapper may include, as shown, a recess 52 to accommodate the post 50. The bumper element 30 is substantially similar in construction and operation as that of the first embodiment, although it may be wider (in the lateral direction of the flapper element) than the individual flapper elements 30 of the first embodiment so as to dissipate the contact forces over a similar total surface area.

In a further embodiment, illustrated in FIG. 9, opposed stop surfaces 60 may be formed on a stop pin 62 extending between the mounting posts 10 above the hinge pin 12. The bumper elements 30 are arranged opposite one another on the respective flapper elements 14 so as to engage the opposed stop surfaces 60 on the stop pin 62. The bumper element 30 is substantially similar in construction and operation as that of the second embodiment.

These and other modifications are intended to fall within the scope of the disclosure.

The invention claimed is:

1. A check valve comprising:
a valve housing defining a valve opening; and
a pair of flapper elements pivotably mounted to the valve housing for rotation relative to the housing between an open position in which they permit fluid flow through the valve opening and a closed position in which they prevent fluid flow through the valve opening; wherein
each flapper element comprises at least one bumper element arranged to engage a stop when in the open position, the bumper element comprising an elastically deformable tongue extending from an upper surface of the flapper element;
wherein the elastically deformable tongue comprises a convex upper surface for engaging the stop.

2. The check valve of claim 1, further comprising a pair of mounting posts arranged on opposed sides of the valve opening and a hinge pin mounted between the mounting posts, said at least one bumper element being arranged at a side region of the flapper element for engagement with a stop provided on a mounting post.

3. The check valve of claim 1, further comprising a pair of mounting posts arranged on opposed sides of the valve opening and a hinge pin mounted between the mounting posts, and a stop post extending away from the opening between the mounting posts, the bumper element be positioned intermediate the sides of the flapper element, for example generally centrally thereof, for engagement with said stop post.

4. The check valve of claim 1, further comprising a pair of mounting posts arranged on opposed sides of the valve opening and a hinge pin mounted between the mounting posts, and a stop pin extending between the mounting posts above the hinge pin, one or more bumper elements being provided on the flapper element to engage the stop pin.

5. The check valve of claim 2, comprising a pair of bumper elements arranged at opposite side regions of the flapper element.

6. The check valve claim 1, wherein the elastically deformable tongue is machined into the flapper element.

7. The check valve of claim 1, wherein the flapper element is generally D-shaped.

8. The check valve of claim 7, wherein the upper surface of the deformable tongue is smoothly curved or facetted.

9. The check valve claim 1, wherein the flapper element comprises nickel steel or an aluminium alloy.

10. The check valve of claim 1, wherein the upper surface is smoothly curved or facetted.

11. A check valve comprising:
a valve housing defining a valve opening;
a pair of flapper elements pivotably mounted to the valve housing for rotation relative to the housing between an open position in which they permit fluid flow through the valve opening and a closed position in which they prevent fluid flow through the valve opening; wherein
each flapper element comprises at least one bumper element arranged to engage a stop when in the open position, the bumper element comprising an elastically deformable tongue extending from an upper surface of the flapper element; and
a groove formed between the elastically deformable tongue and said the surface of the flapper element.

12. A flapper element for a check valve, the flapper element comprising a bumper element for engagement with a stop provided on the check valve, the bumper element being an elastically deformable tongue extending from a surface of the flapper element and a groove formed between the elastically deformable tongue and said the surface of the flapper element.

13. The flapper element of claim 12, comprising a pair of bumper elements arranged at opposite side regions of the flapper element.

14. The flapper element of claim 12, wherein the elastically deformable tongue comprises a convex upper surface for engaging the stop.

15. The flapper element of claim 12, wherein the groove diverges from a proximal end to a distal end.

16. The flapper element of claim 15, wherein the proximal end of the groove is rounded.

17. The flapper element of claim 12, wherein the flapper element is generally D-shaped.

18. The flapper element of claim 12, wherein the flapper element comprises nickel steel or an aluminium alloy.

* * * * *